May 29, 1928.
T. A. WILLARD
STORAGE BATTERY SEPARATOR AND PROCESS OF PRODUCING THE SAME
Filed May 28, 1921    2 Sheets-Sheet 1
1,671,335
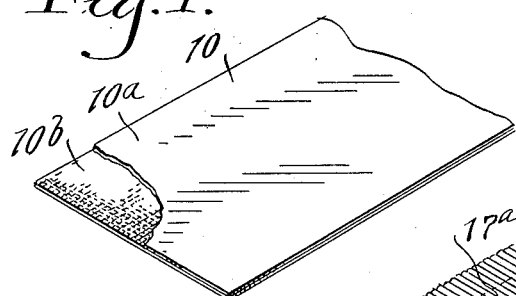
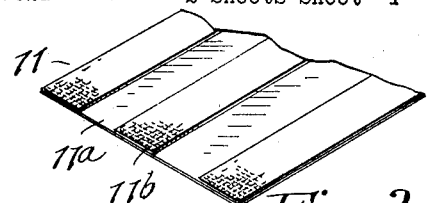
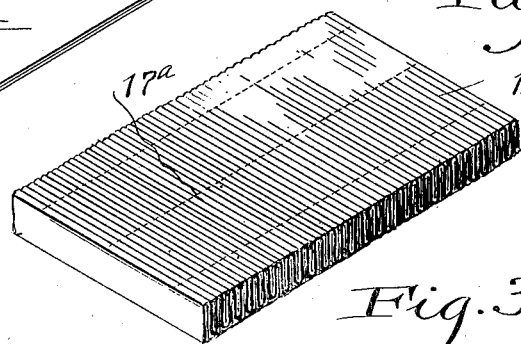
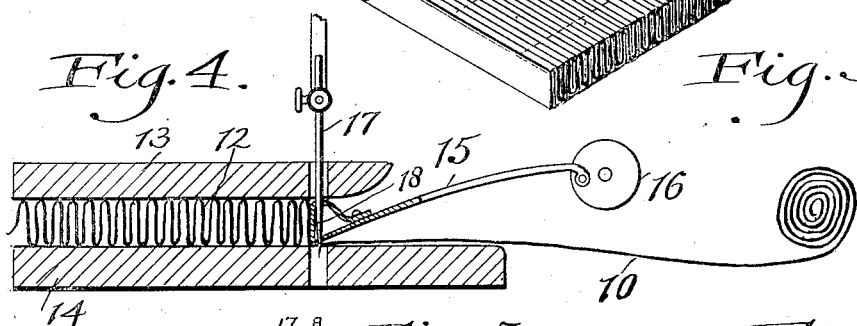
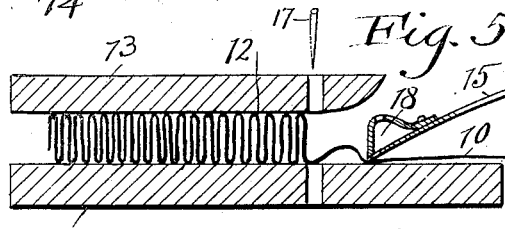
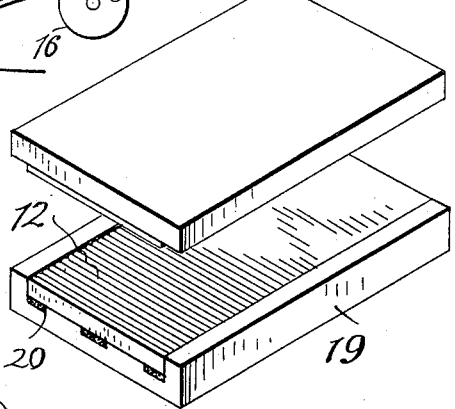
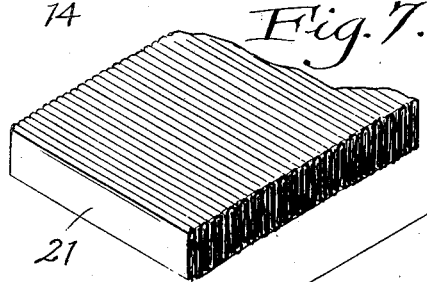
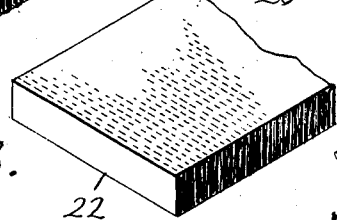
Inventor
Theodore A. Willard
by
Thurston Kwait Hudson
attys May 29, 1928.
T. A. WILLARD
1,671,335
STORAGE BATTERY SEPARATOR AND PROCESS OF PRODUCING THE SAME
Filed May 28, 1921    2 Sheets-Sheet 2
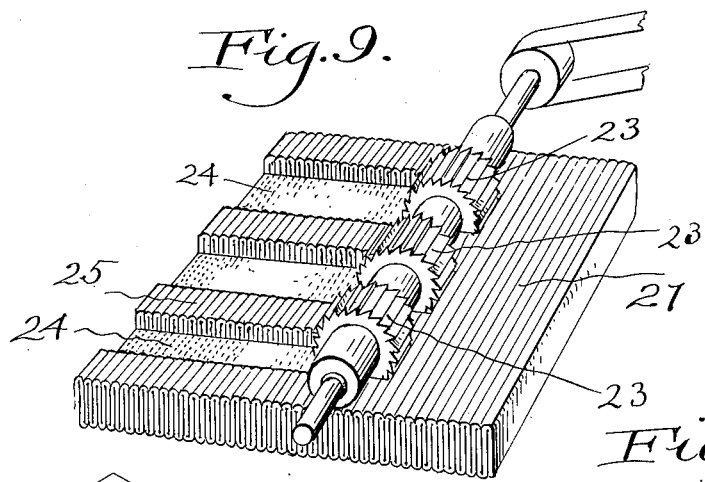
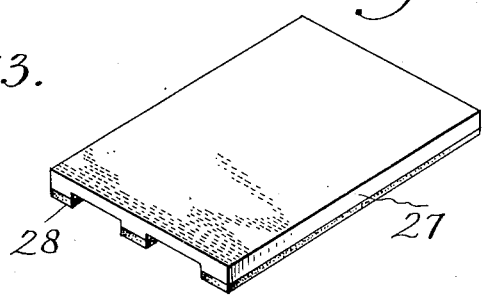
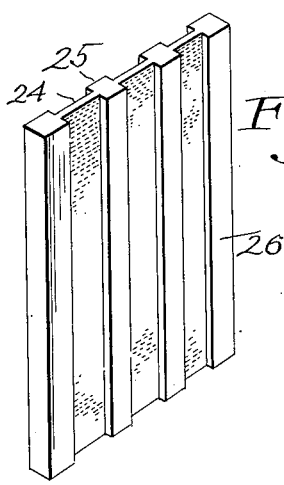
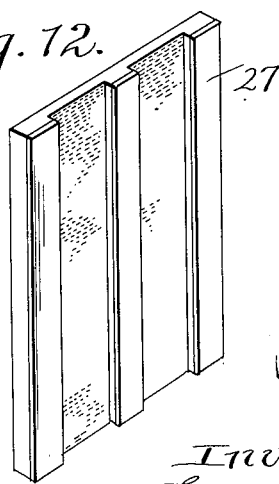
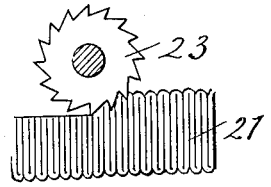
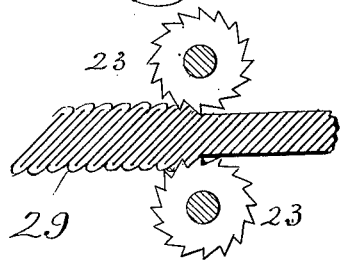
Inventor:
Theodore A. Willard
by
Thurston Kwis & Hudson
attys Patented May 29, 1928.

1,671,335

UNITED STATES PATENT OFFICE.

THEODORE A. WILLARD, OF CLEVELAND HEIGHTS, OHIO.

STORAGE-BATTERY SEPARATOR AND PROCESS OF PRODUCING THE SAME.

Application filed May 28, 1921. Serial No. 473,499.

This invention relates to storage battery separators or insulators, and to the method of producing the same.

The principal object of the invention is to provide a storage battery separator which is highly porous but with the pores of such small size that it is impossible for the active material to pass through them, but are still of sufficient size to allow the solution to pass through, and the usual electrolytic action to take place.

Further the invention aims to provide a separator which is durable or has long life and which is strong mechanically.

Still further, the invention aims to provide an improved process for making porous separators by which very efficient separators may be produced at low cost.

The principal feature of my invention, particularly in the method aspect thereof, is the fact that the separator blank is formed by plaiting or closely folding material in sheet form. The plaits are caused to adhere, and when compacted and solidified form a substantially solid body, the thickness of which depends upon the width of the plaits.

The sheet material which is thus plaited preferably consists of pore producing material, and cementitious material such as rubber, and I prefer to use rubber frictioned fabric. After forming the body of the plaited material, if rubber frictioned fabric or like material is utilized, part or all the surface on one or both sides of the blank is ground off so as to expose the pore producing material, and if desired, also for the purpose of forming ribs on one or both sides.

In the accompanying sheets of drawings, Fig. 1 indicates a portion of the sheet or strip from which the blank is formed by the plaiting process, the strip here shown representing the preferred material, namely, rubber frictioned fabric; Fig. 2 is a similar view showing a sheet or strip of another kind which might be utilized, namely, a body of rubber or equivalent non-porous cementitious material on one or both sides of which thin strips of pore producing material are applied; Fig. 3 is a perspective view somewhat diagrammatic, illustrating the strip after being plaited, like the well known accordion plaiting used in making garments; Figs. 4 and 5 show a simple form of apparatus for the plaiting operation; Fig. 6 shows a simple form of mold in which the plaited material may be cured and compacted or converted from a soft to a hard state; Figs. 7 and 8 are perspective views showing portions of the cured blank before and after milling or grinding off opposite sides to expose the pore producing material; Fig. 9 is a perspective view showing one way in which portions of the separator blank may be removed from the surfaces to expose the pore producing material; Fig. 10 is a similar view showing the plaits of the blank in greater exaggerated thickness; Figs. 11, 12 and 13 are perspective views of finished separators embodying my invention; and Fig. 14 is a view similar to Fig. 10, showing a slight modification.

In forming my improved separator a sheet or strip such as illustrated at 10 in Fig. 1, or 11 in Fig. 2, is utilized. This strip will be of indeterminate length and may have a width corresponding substantially to the width of the separator, or may be a width such that a number of separators may be formed from the blank.

The strip or sheet may be formed in different ways and may consist of different materials. I prefer, however, as before stated, to use rubber frictioned fabric, i. e., fabric thinly coated with rubber and with rubber squeezed into its interstices. In Fig. 1, $10^a$ represents the thin rubber surface, and $10^b$ the fabric.

The strip or sheet shown at 11 in Fig. 2 includes a thin sheet of rubber to which separated strips $11^b$ of pore producing material is applied, which pore producing material may be of such a nature that it in itself will produce the pores, such as thin fabric, and may consist of material which will produce the pores by being dissolved out, in which event thin paper or a suitable paint may be utilized.

Next the strip or sheet is plaited into the form of a flat body indicated conventionally at 12 in Fig. 3, the plaits or folds being designed, however, to closely adhere to and to extend in parallelism back and forth, the thickness of the flat body thus formed being equal to the width or depth of the plaits. While this plaiting can be done with great rapidity in various ways, in Figs. 4 and 5 a simple form of apparatus is shown, consisting of upper and lower plates 13 and 14 between which the strip, here designated 10 is plaited by a reciprocating plaiting blade 15 connected to a suitable actuating device 16, the free edge of the member 15 moving back and forth, and at each forward stroke pushing forward enough of the material to form a double fold or plait as illustrated. I have here shown a needle 17, a series of which can be utilized to form lines of stitching indicated at 17ª in Fig. 3, to hold the plaits together until vulcanization, but usually stitching will not be necessary as I prefer to use uncured rubber for the cementitious material, and this being sticky, the plaits will hold together without any additional holding means. If stitching is unnecessary, the needles may be used advantageously to hold the endmost plait in place while the plaiting blade 15 is being retracted, in which event they will be withdrawn just before the completion of the forward stroke of the plaiter, as indicated in Fig. 5. The plaiter as here shown, carries a pusher 18, which is designed to push the plait solidly or closely up against the previously formed plait.

After the plaited body 12 is formed, it is vulcanized in a suitable mold such as indicated at 19 in Fig. 6, it being understood that when in the mold, the body 12 is under pressure, causing the adjacent plaits to be solidly clamped together, and eliminating all openings or spaces which may have previously existed in the plaited body. In this vulcanizing operation it may be desirable to vulcanize rib forming strips to one or both faces, and in Fig. 6 the bottom of the mold is shown as provided with grooves containing rib forming strips of rubber 20, which in the vulcanizing process are firmly vulcanized to the solid plaited body. In the figures so far described, the plaits are shown as being at right angles to the surfaces of the plaited body, but this is not necessary as they may be inclined to the surfaces, as illustrated in Fig. 14. The inclined plaits may be employed not only to cause a better shedding of the active material, but in order that the plaits may be more solidly clamped together in the vulcanizing mold by pressure between the bottom and top members of the mold.

The vulcanized plaited body when rubber frictioned fabric or equivalent sheet or strip faced with rubber is utilized, is not porous, and requires suitable treatment to provide pores extending therethrough, the lack of porosity at this stage of the process being due to the fact that opposite surfaces of the vulcanized body are covered with rubber. Therefore, in the next step of the process the body is rendered porous by grinding or cutting off part or all of opposite surfaces so as to expose the porous or pore producing material, and also if desired, for the purpose of forming ribs on one or both surfaces.

In Fig. 7 I have shown at 21 a non-porous vulcanized blank after removal from the vulcanizing mold, though in this instance it is not provided with the ribs such as would be formed by the rubber strips 20, shown in Fig. 6, and in Fig. 8 I have shown at 22, the blank rendered porous, and, indeed, highly porous by grinding or cutting off opposite surfaces to expose the porous material, the high porosity being due to the very numerous closely arranged folded sections of the fabric, it being understood that the body is a solid body of rubber and of the pore producing material free from pores except those which exist in the uniformly spaced pore producing material.

For the purpose of exposing the pore producing material on opposite sides of the blank, a suitable grinding or milling tool may be employed, as indicated in Figs. 9, 10 and 14. If plain surfaced separators are to be formed, i. e. flat on both sides, the entire surface on both sides of the blank will be cut away to a depth at least equal to and preferably in excess of the depth of the rubber coating or layer on both sides of the blank. If ribs are to be formed, only the portions between the ribs will be cut away. This I have indicated in Fig. 9, wherein the vulcanized blank is fed past a series of spaced rotating cutters 23, cutting grooves 24, the depth of the cut exposing the porous material, and leaving ribs 25 between the cut away portions. This same operation can be carried out simultaneously on both sides of the blank, in which event it will be fed between two sets of cutters which may be similar to those illustrated in Fig. 9. By this cutting operation a separator such as shown at 26 in Fig. 13 is produced.

If the ribs are to be formed on one side, only, a separator such as shown at 27 in Figs. 11 and 12 is produced, this separator having the porous material exposed wholly over one side and between the ribs on the opposite side. In this instance the ribs are formed not only by the uncut portions of the plaited blank, but also by strips of rubber 28 which are vulcanized to the uncut portions, these strips being applied during the vulcanizing operation by the rubber strips illustrated in Fig. 6. The rib forming strips 28 not only perform the usual spacing function but very materially strengthen the separator, it being noted that the ribs in Figs. 11 and 12, and also in Fig. 13 are at right angles to the plaits of the blank from which the separator is formed.

In the figures so far described, the plaits are shown as being at right angles to the surfaces of the blank, but this relationship is not necessary, for as already stated, it may be desirable to have the plaits incline to the surfaces of the blank as illustrated at 29 in Fig. 14. In this event the porous material will not extend through the separator at right angles to its surfaces, but will be inclined somewhat as illustrated at the right hand side of Fig. 14. If the inclined plaits are utilized, the surface toward which the porous material or plaits incline downwardly will be placed against the positive plate of the battery so that the inclination of the plaits will be such that the shedding from the plate would even to a greater extent than with the other construction be prevented from passing through the separator. An additional advantage already explained, is that a tighter clamping of the plaits in the mold is obtainable.

I have heretofore mentioned that instead of using porous material such as fabric, the rubber might be coated with strips of tissue or other paper or paint. If such materials are utilized with the non-porous cementitious material, it is proposed that they be dissolved out from the separator by suitable acid treatment, leaving very minute and practically microscopic slits where the paper or paint, or other suitable pore producing material which might be employed, prevented the plaited rubber from being vulcanized together in the vulcanizing process.

I prefer, however, to use for the pore producing material, material which in itself is porous, and which remains in the separator throughout its life, an example of this being cotton fabric, which I find, particularly after undergoing vulcanization, is not eaten or destroyed by the acid of the battery. Other porous materials than woven fabric may, if desired, be employed.

The separators made by my process have an exceedingly high degree of porosity so that the internal resistance of the battery using such separators is low, but still the separators are impervious to the active material, and furthermore, they are strong mechanically, and will function properly throughout the life of the battery. Additionally the process of forming these separators is such that it lends itself to rapid production and low cost of manufacture.

I do not wish the method confined to the step of cutting or grinding the surface or surfaces of the plaited blank, for it may be possible to form the body with the pore producing material so provided with the cementitious material that the pore producing material will be exposed on both sides of the blank without the surface cutting or grinding step.

Having described my invention, I claim:

1. A storage battery separator composed of a relatively thin, substantially flat solid body formed of closely arranged contacting plaits of a sheet containing porous material, the depth of the plaits being squal to the thickness of the separator.

2. A storage battery separator consisting of a thin, substantially flat body formed from closely arranged adhering plaits of porous material and a cementitious material, the folds of the plaits being at the surfaces of the separator.

In testimony whereof, I hereunto affix my signature.

THEODORE A. WILLARD.